W. R. KEY.
COTTON CHOPPER.
APPLICATION FILED MAY 7, 1910.
988,353.
Patented Apr. 4, 1911.
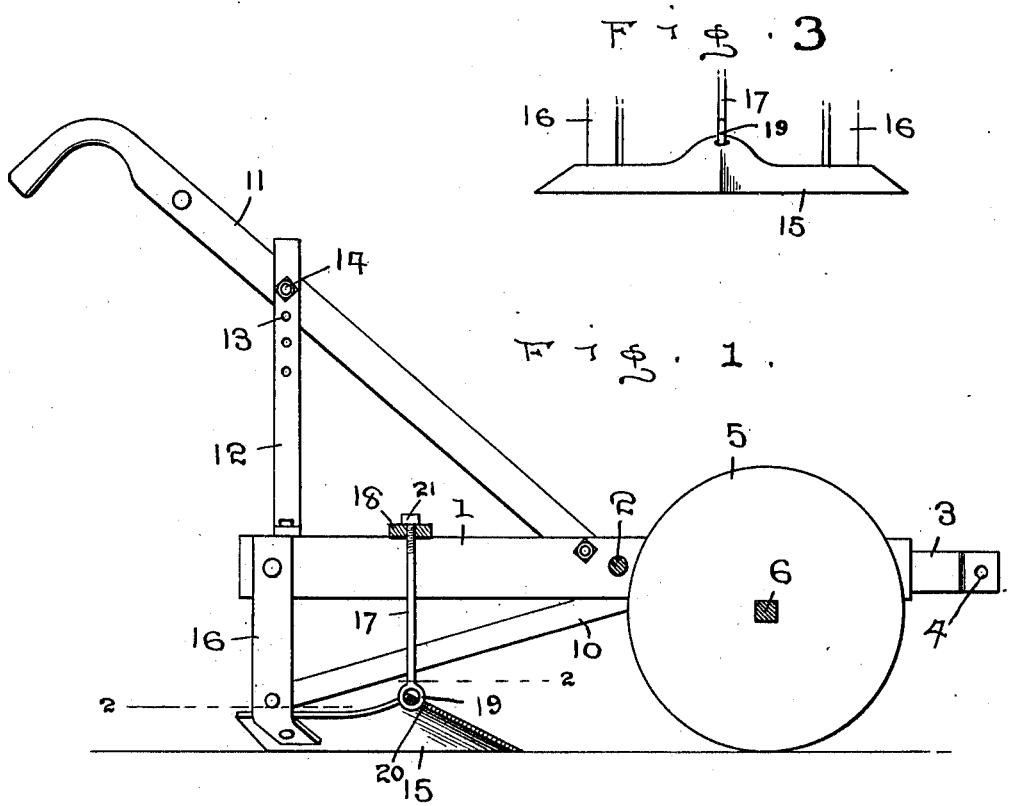
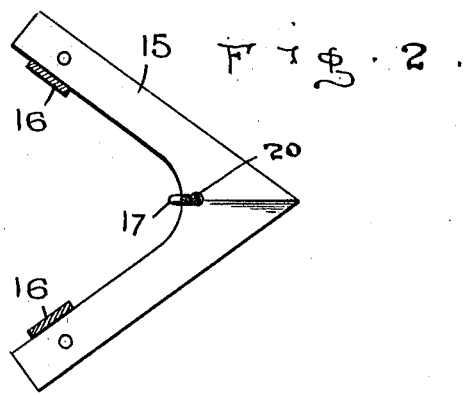
WITNESSES:
Thos. W. Riley
B. Christie
INVENTOR
W. R. Key
BY
W. J. Fitzgerald & Co.
Attorneys

UNITED STATES PATENT OFFICE.

WILLIAM R. KEY, OF MOULTRIE, GEORGIA.

COTTON-CHOPPER.

988,353.  Specification of Letters Patent.  Patented Apr. 4, 1911.

Application filed May 7, 1910. Serial No. 559,966.

*To all whom it may concern:*

Be it known that I, WILLIAM R. KEY, a citizen of the United States, residing at Moultrie, in the county of Colquitt and State of Georgia, have invented certain new and useful Improvements in Cotton-Choppers; and I do hereby declare the following to be a full, clear, and exact description of the invention, such as will enable others skilled in the art to which it appertains to make and use the same.

My invention relates to new and useful improvements in cotton choppers and my object is to provide a device of this class, which may be drawn by an animal or operated by hand, and, a further object is to provide a suitable cutting blade, which may be used for cultivating purposes when desired.

Other objects and advantages will be hereinafter referred to and more particularly pointed out in the specification and claims.

In the accompanying drawings which are made a part of this application, Figure 1 is a longitudinal sectional view through the cultivator showing the combination cultivating and chopping blade. Fig. 2 is a sectional view as seen on line 2—2 Fig. 3, and, Fig. 3 is a front elevation of the combined cultivating and chopping blade.

Referring to the drawings in which similar reference numerals designate corresponding parts throughout the several views, 1 indicates the side bars of the cultivator frame, which are connected together by means of rods 2, the front ends of the side bars being connected together by means of curved arms 3, the free ends of said arms having openings 4 therethrough, to which may be secured a swingletree when the cultivator is operated by a draft animal. Positioned between the forward ends of the side bars is a guide wheel 5, which is mounted upon an axle 6, said axle being rotatably mounted between the side bars. Depending from the rear ends of the side bars 1 are shanks 16, to the lower ends of which are secured the rear ends of a V-shaped cutting blade 15, and in order to thoroughly brace the shanks, brace bars 10 are extended from the side bars 1 and engage the shanks 16 adjacent their lower ends. Extending upwardly and rearwardly from the side bars 1 are handles 11, whereby the cultivator may be readily controlled, said handles being made adjustable by extending upwardly from the side bars, straps 12, said straps having a plurality of openings 13 therein to receive bolts 14 by which the handles may be readily adjusted upwardly or downwardly.

When it is desired to space the growing plants apart, the chopper is moved transversely across the rows of growing plants and by forming the blade of proper dimensions, a certain number of plants will be removed as the chopper is passed over the rows, thus forming a space between the hills of growing plants in both directions.

It will be seen that by constructing the blade 15 substantially V shaped, the plants will not only be removed but the soil will be cultivated and moved toward the hills of growing plants.

The blade 15 extends a distance forwardly of the shanks 16 and in order to thoroughly brace the same, a rod or bolt 17 is attached to the blade 15 at its longitudinal center and extended upwardly through a plate 18, which plate extends across the tops of the side bars 1 and is secured thereto in any preferred manner, and the lower ends of the shanks 16 are extended outwardly and pass below the blade 15, said blade being inclined so as to elevate the soil as it passes over the blade. The lower end of the rod 17 is provided with an eye 19 which is engaged with an opening 20 in the rear edge of the blade 15, as not to interfere with the cutting edge of said blade, and it will be seen that should the blade strike a stone, or other small obstruction, the forward end thereof will be allowed to rise over the same, in view of the play between the rear edge of the blade and said eye. The upper end of the bolt extends loosely through an opening in the plate 18 and is threaded and engaged with a nut 21, said nut resting on the upper face of the plate 18, by means of which said rod may be slightly raised or lowered. Should the blade strike a larger obstruction, however, it may be allowed to ride thereover, since there is nothing to prevent the upward movement of the bolt 17 through the plate 18, although the nut 21 does limit its downward movement. It also often happens that the forward end of the blade is just a slight bit too low or too high for the effective operation of the device, and to suit conditions, it becomes necessary for the bolt 17 to be raised or lowered, so that it can be seen wherein the adjusting nut and bolt perform a new, novel and useful function. It may appear from the fact that the shanks 16 are secured to the blade, that said blade would not be capable of movement, but it will be seen that the blade is of V-shape, that the shanks are secured at the extreme rear ends of the arms thereof and that the forward portion of the blade engages with the soil as well as the rearward portions. A brace is therefore necessary and as the shanks 16 merely hold the blade in one position, the providing of a brace which is capable of adjustment is really a necessary improvement.

In planting cotton, the seeds are drilled in rows and after the plants have grown to a certain height, it is necessary to destroy or thin out portions of the plants and by employing my improved form of device and passing the same transversely across the rows, the thinning operation can be speedily accomplished and by properly guiding the chopper, the plants left standing will be in a straight row in both directions. It will further be seen that the device can be very cheaply constructed and with proper care is indestructible from use and it will further be seen that by using the form of blade 15, the device can be used for cultivating purposes, as well as for chopping the plants.

What I claim is:—

1. In a cotton chopper, the combination with side bars, connecting means therebetween, a guide wheel rotatably mounted between the side bars, and handles therefor; of shanks depending from the rear ends of said side bars, a V-shaped blade having the rear ends thereof secured to said shanks, a plate extending transversely of the side bars, and provided with an opening therein, a bolt extending through the opening in said plate and having the lower end thereof engaged with the forward end of said blade, said bolt being capable of vertical movement through said plate in the operation of said blade.

2. In a cotton chopper, the combination with side bars, connecting means therebetween, a guide wheel rotatably mounted between the side bars, and handles for the device; of shanks depending from the rear ends of said side bars, a V-shaped blade having the rear ends secured to said shanks, a plate extending transversely of the side bars, a bolt extending through said plate and having the lower end thereof provided with an eye in engagement with an opening in the forward end of said blade, and means engaging the opposite end of said bolt to slightly adjust the length thereof.

In testimony whereof I have signed my name to this specification in the presence of two subscribing witnesses.

WILLIAM R. KEY.

Witnesses:
ALFRED R. KLINE,
Z. W. CLARK.

---

Copies of this patent may be obtained for five cents each, by addressing the "Commissioner of Patents, Washington, D. C."